July 4, 1939.  N. FODOR  2,165,176
INTERNAL COMBUSTION ENGINE
Filed Oct. 19, 1936  2 Sheets-Sheet 1

Inventor
N. Fodor
by
Attorney

July 4, 1939.  N. FODOR  2,165,176
INTERNAL COMBUSTION ENGINE
Filed Oct. 19, 1936  2 Sheets-Sheet 2

Inventor
N. Fodor
by
Attorney

Patented July 4, 1939

2,165,176

UNITED STATES PATENT OFFICE 2,165,176

INTERNAL COMBUSTION ENGINE

Nicholas Fodor, Wauwatosa, Wis., assignor to Allis-Chalmers Manufacturing Company, Milwaukee, Wis., a corporation of Delaware Application October 19, 1936, Serial No. 106,265

9 Claims. (Cl. 123—32)

This invention relates to internal combustion engines of the solid injection type and more particularly to low compression engines having timed injection and ignition of the fuel charges.

It has long been an object of engine designers to develop a low cost engine having the compression and ignition characteristics of the ordinary gasoline engine which can be operated on the cheap, heavy and non-volatile fuels with resultant efficiencies and torque characteristic comparable to those of the ordinary Diesel or compression ignition engine.

In the operation of engines designed to meet the aforementioned requirements, the air charge is introduced during the suction or intake stroke, the fuel is injected in a finely divided or highly atomized state during the compression of the air charge, the compression temperature being below the ignition temperature of the injected fuel, and the resulting mixture is ignited, generally by an ordinary spark ignition means, when the piston is near its top dead center position and after or at the time injection of the fuel ceases. However, material difficulties have been experienced in obtaining satisfactory performance from these engines especially when operating under light loads, while idling and at relatively high speeds, and these difficulties have been considered as due primarily to the formation of fuel-air mixtures which are not readily ignitable.

In order to overcome the aforementioned difficulties, it has been proposed to inject one or two sprays or jets of heavy, non-volatile fuel in a highly atomized state into a rotating air charge during the latter stages of the compression thereof; the rate of rotation of the air charge and the time and duration of the fuel injection being so correlated and the ignition device being so positioned that a segregated fuel-air mixture is swept past the ignition device without material diffusion and at same time when said device is rendered operative. The injection of the fuel during the latter stages of compression when the piston is nearing top dead center is desirable since it prevents the fuel from reaching the relatively cool cylinder walls and adhering thereto before the charge is ignited, especially if the piston head is provided with a substantially continuous upstanding peripheral flange or is dished to form a cup into which the injected fuel is directed during the period of injection. The rotation of the air charge facilitates mixing of the fuel and air, thus reducing the time required for the formation of a combustible mixture, which is a decided advantage since the time interval during which the mixing can take place is relatively short. These improvements have resulted in an increased efficiency and substantially satisfactory operation when the engine has been materially loaded, but during slow speed operation under relatively light loads and while idling and at relatively high speeds the engine runs unevenly, the exhaust is smoky and the fuel consumption is excessive.

The aforementioned uneven operation experienced during slow speed operation under light loads and while idling is believed to be due to the fact that under these conditions the rotation of the air charge in the known types of these engines is negligible and has little, if any, effect upon the formation of a readily ignitable and combustible mixture and will not move the segregated fuel-air mixture into igniting relationship with the ignition device. Consequently, in order to maintain the engine operating, the duration of fuel injection must be increased which produces an excessively rich mixture, incomplete combustion, a smoky exhaust and a decrease in efficiency. During high speed operation, the degree of atomization and the distribution of the injected fuel is insufficient to form a readily ignitable and combustible mixture in the short time available and as a result, the combustion is incomplete, the exhaust is smoky and the power output decreases. Moreover, it is the general practice to cool the cylinder wall and cylinder heads of the ordinary engine and if a segregated fuel-air mixture is swept along adjacent the cylinder wall or head and into igniting relation with an ignition device placed therein, the cooled surfaces will lower the temperature of the mixture and make its ignition more difficult.

Further attempts to obtain satisfactory slow speed, light load and idling operation have been made by varying the air charge in accordance with the load requirements and by increasing the intensity of the igniting spark. The reduction in the air charge has produced improved results due to the fact that too much excess air produces a cooling action which lowers the temperature of the air charge below the vaporizing temperatures of the injected fuel and the provision of means for producing a material increase in the spark intensity involves additional expense and does not eliminate detonation although it does increase the smoothness of operation to some extent. However, throttling of the air intake to make the air charge commensurate with load requirements materially reduces the turbulence in the air charge, particularly for slow speed, light load and idling operation, so that under these conditions, its effect on the formation of a uniform mixture is negligible.

It has been definitely established that the known types of these engines can be made to run smoothly when operating at slow speeds and under light loads and while idling by merely increasing the time interval between the fuel injection and the spark and it is immaterial whether such increase is produced by retarding the spark or advancing the injection or both; the significant fact being that with a longer time interval a combustible mixture is formed that is readily ignitable which is indicative that the formation of a readily ignitable mixture is a function of the time required for vaporization of the fuel since vaporization is a time function. The vaporization theory also satisfactorily explains the so-called "ignition lag" present in all compression, ignition engines and is in strict accordance with the recently advanced "oxidation" theory. In this connection it should be borne in mind that the rate of vaporization varies with the degree of atomization and consequently, the greater the degree of atomization and the more uniform the distribution of the injected fuel, the shorter the time interval will be within which a readily ignitable and combustion mixture will be formed. However, increasing the aforementioned time interval to obtain smooth operation is impractical since the maximum time interval obtainable consistent with efficient operation is extremely small, especially in relatively high speed engines adapted for vehicle operation.

A series of tests have conclusively demonstrated that the lighter and more volatile the fuel oil used, the slower these engines can be operated under light loads and while idling regardless of whether or not devices are utilized for maintaining the air charge in a turbulent state which is also indicative that the formation of a readily ignitable and combustible mixture is dependent upon the vaporization of the injected fuel. However, the use of such fuels in engines of this type would defeat the very purpose for which they were designed.

Accordingly, this invention presents methods and apparatus for carrying them out based upon the vaporization theory in contradistinction to the segregated charge formation theory of Hesselman as exemplified by the U. S. Patents to Hesselman Nos. 1,835,490 and 2,046,264.

In this connection, recent experiments have established that in order for a readily ignitable and combustible mixture to be formed and ignited during the short time available the following constructions and mode of operation should be utilized: (1) a substantially constant fuel air ratio should be maintained throughout the entire range of engine operation; (2) the time of injection should occur during the latter stages of the compression of the air charge; (3) the injection nozzle should have apertures which are so arranged as to instantaneously and completely impregnate the entire air charge without contacting the cooled surfaces of the cylinder wall and head (the piston head being preferably dished or cup shaped to aid in preventing the fuel from contacting the cooled surfaces; (4) the air charge should be in a state of turbulence to facilitate mixing and flame propagation (the greater the degree of atomization and the better the distribution of the injected fuel, the less turbulence necessary); (5) ignition should be delayed as long as is possible consistent with efficient operation; and (6) the ignition of the mixture should take place in the hottest portion or zone thereof.

Of the foregoing, features 2, 4 and 5 can be varied considerably without materially affecting the smoothness of slow speed operation under light loads and while idling, but features 1, 3 and 6 are essential for satisfactory operation under all conditions and particularly the latter, since in order for the fuel-air mixture to be readily ignited, the fuel must be in a vaporized state and, in order to obtain a slow, orderly burning, combustion should progress from the hotter portion of the mixture outwardly towards the cooler portions thereof which prevents detonation and a resulting loss of power. In contrast to this, it has been definitely established that when ignition takes place in a cool portion of the mixture, for example, near the cylinder head or side wall, the mixture adjacent thereto being relatively cool while the rest of the mixture is relatively hot and is at or near the verge of ignition, the result is extremely rapid combustion or detonation.

The provision of a dished or cup shaped piston head also facilitates the initial vaporization of the injected fuel and, in this connection, it is well to point out that the effect of vaporization in the piston cup, although modified slightly by the greater cooling action during slow speed, light load operation causes the time rate of combustion and the resultant pressure rise to vary inversely with the engine speed while turbulence in the air charge causes the time rate of combustion to vary directly proportional to the speed. Consequently, a properly designed engine should correlate these two effects so as to maintain the time rate of combustion as rapid and as uniform as is practically possible consistent with efficient and smooth operation for all conditions of engine load and speed, care being taken not to overlook the fact that the vaporization effect is controlling since the turbulence becomes negligible during slow speed, light load operation, particularly in engines in which the air is throttled to obtain an air charge commensurate with the load and fuel requirements.

Consequently, a further object of this invention is to provide a mode of operation and an arrangement of parts incorporating the aforementioned essential features which will entirely eliminate the previously mentioned defects.

Another object of this invention is to provide a novel method of charge forming and burning which will produce positive ignition and a slow, orderly burning throughout the charge under all conditions of engine operation.

Another object is to provide a novel manner of forming and igniting a fuel-air mixture in a low compression, airless injection engine employing timed fuel injection and ignition.

Another object is to provide apparatus and an arrangement of parts by which all of the above stated methods may be carried out.

The invention accordingly consists of the various methods and features of construction, combinations of elements and arrangement of parts as more particularly pointed out in the appended claims and in the detailed description, reference being had to the accompanying drawings, in which:

Figure 1:
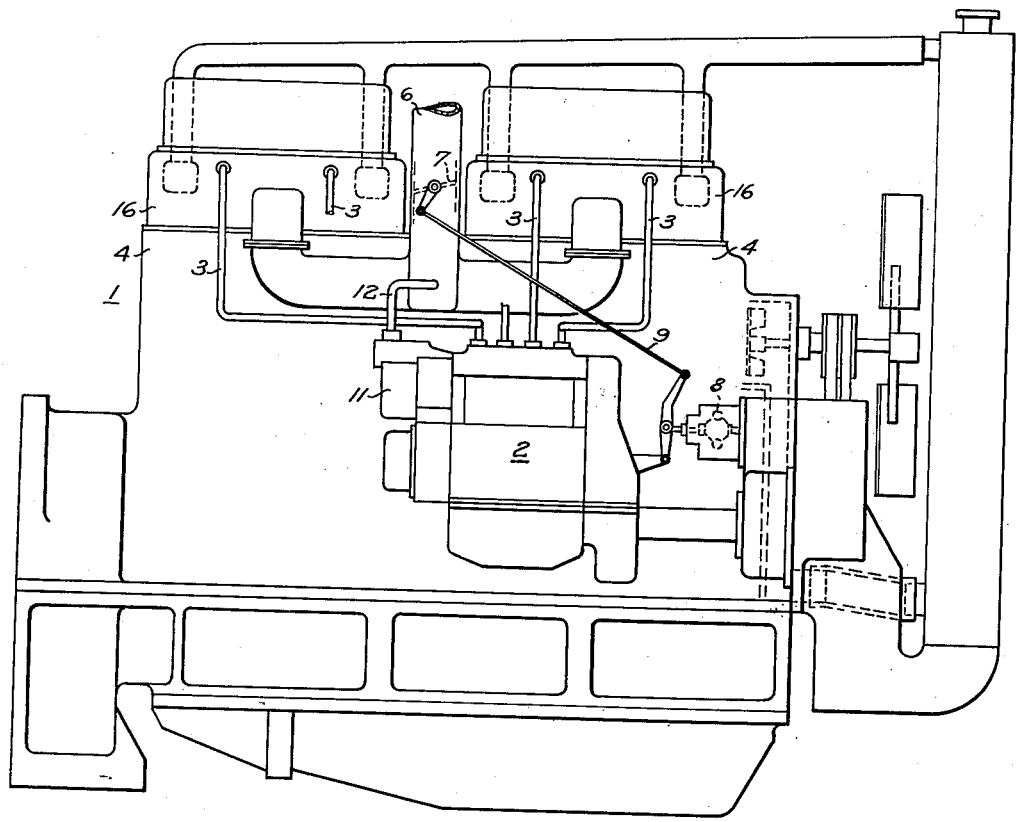
Fig. 1 is an elevational view of an engine embodying the invention.

Referring to Fig. 1, I denotes a four cylinder, low compression solid injection engine having a fuel injection system including an injection pumping unit 2 for delivering metered quantities of fuel under pressure and in timed relation to the engine cycle through the pipes 3 to the individual engine cylinders 4, an air intake manifold 6 controlled by the usual throttle valve 7 which is operatively associated with a speed responsive governing device 8 by means of the linkage 9, and a vacuum responsive device 11 operatively associated with the intake manifold 6 on the engine side of the throttle valve 7 by means of pipe 12 and with the fuel pumping unit 11 by a means (not shown) so that the pumping action is varied in accordance with the degree of vacuum in the intake manifold, which in turn varies in accordance with the position of the throttle valve and the engine speed; the arrangement being such that a substantially constant fuel air ratio is maintained for all operating conditions of the engine.

The particular form of fuel pumping and regulating apparatus employed is immaterial and is not essential for a complete understanding of the invention and since there are many known forms of satisfactory arrangements which could be utilized, a more detailed description thereof is deemed unnecessary.

Figure 4:
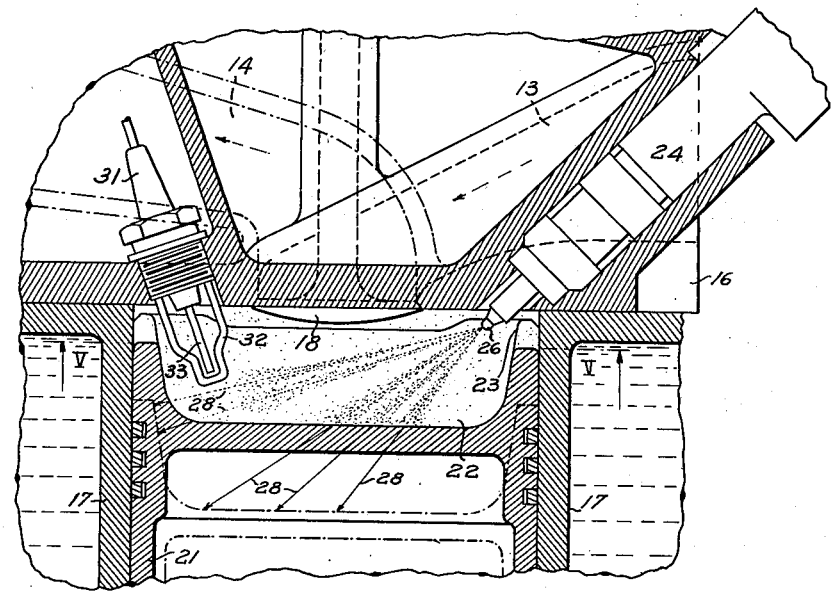
Fig. 4 is a sectional view of the engine cylinder taken on line IV—IV of Fig. 5.
Figure 5:
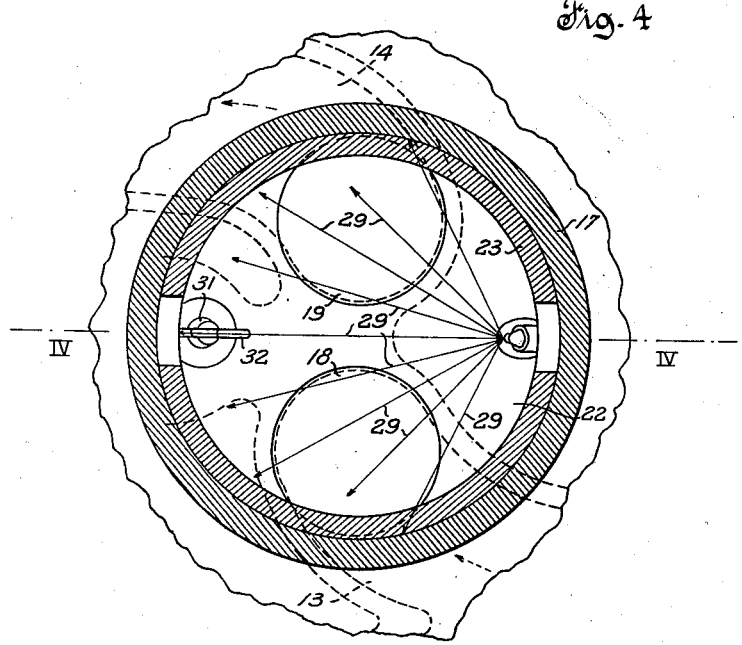
Fig. 5 is a sectional view of the engine cylinder taken on line V—V of Fig. 4.

Referring to Figs. 4 and 5, it is readily seen that the engine is of the overhead valve type having streamlined inlet and exhaust passages 13 and 14 formed in the cylinder head 16 and terminating eccentrically with respect to the axis of the cylinder 17. Suitable inlet and exhaust valves 18 and 19, which are actuated by a known form of cam and rocker arm assembly (not shown), control the inlet and exhaust passages 18 and 19. The cylinder 17 has a piston 21 mounted to reciprocate therein and having a cup shaped head 22 formed in any desired manner which may have its rim 23 slightly recessed to accommodate the ignition and injection devices as shown in Fig. 4.

Figure 3:
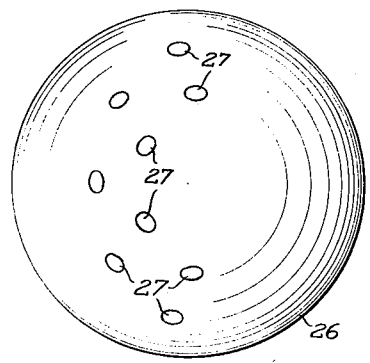
Fig. 3 is an end elevational view of the nozzle tip.

Projecting downwardly through the cylinder head 16 and toward the axis of the cylinder is a fuel injecting device 24 having a nozzle tip 26 containing nine apertures 27, see Fig. 3, for projecting sprays of fuel into the piston cup 22 so as to uniformly distribute finely atomized fuel throughout the entire air charge contained therein; the direction and the degree of penetration of the individual sprays being indicated by lines 28 and 29 shown in Figs. 4 and 5 as extending from the nozzle tip. In Fig. 5 the lines 29 indicate the general direction of and the relative angles between the sprays; the arrows designating the degree of penetration or the approximate point at which the sprays terminate or impinge against the wall or bottom of the cup when the piston is in the full line position shown in Fig. 4. The lines 28 shown in Fig. 4 indicate the position of the sprays relative to ignition device and to the piston cup when the latter is moving upwardly from its dotted line position to the full line position; the former showing the position of the piston at the instant injection commences and the latter its position when injection terminates.

An ignition device 31 projects downwardly through the cylinder head 16 and toward the axis of the cylinder at a point substantially diametrically opposite the fuel injector 24 and comprises a generally U-shaped outer electrode 32 and an inner electrode 33; the electrodes extending in a common plane downwardly into the piston cup 22, when the piston is in the full line position shown in Fig. 4, with the plane of the electrodes substantially parallel to or coinciding with the vertical plane containing the axis of the adjacent spray so that the outer electrode 32 effectively shields the inner electrode 33 from the wetting action of any fuel projected in the adjacent spray which might contact the ignition device. In the particular arrangement utilized, the ignition device is not contacted by the cores of any of the sprays issuing from the nozzle and the core of the adjacent spray lies in the vertical plane common to the electrodes 32 and 33 and passes beneath the lowermost end of the outer electrode 32 at a distance preferably not less than one-quarter nor more than one-half of an inch, as is clearly indicated in Fig. 4. With this arrangement, if any wet fuel does strike the ignition device, as a result of improper injection, it will collect on the outer electrode and drain therefrom without wetting and fouling the inner electrode 33 and the ignition device.

Figure 2:
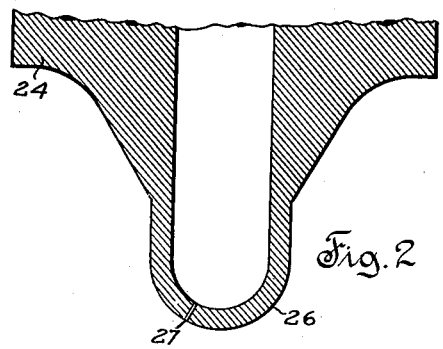
Fig. 2 is a partial sectional view of the nozzle tip.

The general arrangement of the apertures or orifices in the nozzle tip is shown on an enlarged scale in Fig. 3; Fig. 2 being a central vertical sectional view through the tip showing the downwardly directed orifice that directs the fuel spray beneath the igniter in the manner previously described. In this connection, it may be well to point out that alternate sprays are directed toward the top and bottom of the wall portion of the cup at the beginning of injection so as to uniformly distribute the finely divided fuel throughout the entire air charge confined therein; the central spray being directed toward the top or rim portion of the cup, but terminates just short thereof, (see the dotted line position of the piston shown in Fig. 4) with the remaining sprays being alternately directed toward the bottom and top portions of the cup wall. Of course, as the piston moves upwardly to its full line position in Fig. 4, those sprays which were directed toward or impinged against the wall of the cup adjacent the rim are in effect moved downwardly toward the bottom thereof and those which were directed toward or impinged against the wall adjacent its bottom are in effect moved inwardly and impinge on the bottom of the cup. Injecting the fuel in this manner insures that the entire air charge confined within the cup is completely and uniformly impregnated with finely divided fuel regardless of whether or not the air charge is maintained in a turbulent state.

While it has not been deemed necessary to illustrate and describe any particular means for operating the fuel injector and ignition device in timed relation with the engine cycle, it is to be understood that these devices are and can be so operated by any suitable means known to persons skilled in the art.

For purposes of illustration and in order that the invention may be thoroughly understood, the more important details of construction of the engine illustrated in Figs. 1, 4 and 5 will be set forth. The engine is of the four cylinder, four cycle stroke type having a 5¼ inch bore, a 6½ inch stroke, a compression ratio of approximately 6.5 to 1 and with a full load speed of approximately 1050 R. P. M.

The streamlined inlet and exhaust passages which are located in the cylinder head are as large as the head construction will permit so as to facilitate the ingress of air and the egress of exhaust gases, and it should be noted that it is particularly desirable to make the exhaust passage as large as possible in order to completely evacuate the cylinder.

The bottom of the piston cup is approximately 1 13/32 inches below the top or the rim thereof which is in close proximity to the cylinder head when the piston is at its top dead center position. The temperature of the piston is primarily controlled by the relative location of the piston rings which are substantially the sole means for transferring heat from the piston head to the cylinder walls and into the surrounding cooling fluid. Consequently, in engines of this type, it is desirable to position the rings so as to maintain the bottom of the piston cup at or slightly above the oil vaporizing temperature in order to vaporize the atomized fuel which is in proximity thereto and prevent the carbonization of any fuel which may come into direct contact therewith. In order to obtain this effect, three ring grooves 3/16 of an inch wide and spaced 3/16 of an inch apart are provided near the head; the top groove being 1 1/4 inches and the lower groove about 2 3/16 inches below the rim of the cup. Suitable rings of ordinary construction are positioned in these grooves. An ordinary oil ring (not shown) is positioned in a suitable ring groove located about 2 1/8 inches below the top of the cup. The wall of the cup is continuous and prevents any of the fuel directed into the cup from contacting the cylinder wall and condensing thereon which is highly undesirable for obvious reasons.

The injection nozzle projects at an angle through the cylinder head towards the axis of the piston with the tip or apertured portion closely overlying the rim of the cup at the time injection terminates. The particular number of apertures employed in the nozzle tip is immaterial providing the entire air charge confined within the cup is instantaneously and completely impregnated with finely atomized fuel so as to form a uniform mixture regardless of whether or not the air charge is rotated, the direction and the degree of penetration of the impregnating sprays being such that no fuel contacts the cooled surfaces of the cylinder at any time during the period of injection.

The ignition means, which in this instance is a spark plug, extends at an angle through the cylinder head and towards the axis of the piston with the electrodes, which provide the spark gap, terminating a material distance from the side wall of the piston cup and not more than 1/8 of an inch from the bottom of the cup at about the time injection terminates so that the spark will be produced and burning initiated in the hottest or first vaporized portion of the mixture which is that portion in the immediate vicinity of the bottom of the cup at a material distance from the side wall thereof.

The timing of the fuel injection and ignition producing the best overall efficiency is such that injection commences at approximately 45° and ignition takes place at approximately 12° before top dead center. Of course the proper timing is dependent upon numerous factors, some of the most important being the engine speed, the compression pressure and temperture, the volatility and viscosity of the fuel, the degree of atomization, distribution and penetration of the injected fuel and the rate of vaporization.

The operation of the engine, a single cylinder being taken as illustrative, is as follows: Assuming the piston is near the end of the power stroke, the exhaust valve opens and the piston moves upwardly forcing the burned gases from the cylinder. At approximately top dead center, the inlet valve opens and the exhaust valve closes, the piston thereafter moving downwardly on the intake stroke. The inlet valve closes when the piston is near bottom dead center and the air charge is compressed as the piston moves upwardly. At approximately 45° before top dead center, fuel injection commences and at or after the termination of fuel injection, which lasts for approximately five thousandths of a second, and at approximately 12° before top dead center ignition takes place and burning is initiated so that combustion progresses uniformly from the hotter to the cooler portions of the mixture with the maximum combustion pressure occurring at approximately 10° past top dead center. The piston continues its downward movement due to the effect of the expanding gases and completes the power stroke.

The speed responsive governor functions to position the throttle valve in the intake manifold so that the air charge drawn into the cylinder is commensurate with the load requirements and the vacuum responsive device functions to vary the pumping action accordingly so that, as a result, the fuel air ratio is maintained substantially constant for all conditions of engine operation.

The manner of charge formation wherein fuel is injected into the combustion chamber in numerous sprays so as to instantaneously and completely impregnate the air confined within the piston cup with finely divided or atomized fuel during the latter stages of the compression of the air charge and without having the impregnating jets contact the cooled surfaces of the combustion chamber results in the immediate formation of a uniform mixture or charge without loss of fuel by condensation on the cooled surfaces. Moreover, the use of a plurality of extremely small jet orifices for spraying the fuel results in a greater degree of atomization and a much better distribution of the injected fuel which materially decreases the time interval necessary to effect its complete vaporization.

As a result, the time required for injection and the formation of a uniform mixture is materially reduced which allows the injection to begin later or terminate sooner, the former arrangement being preferable in slow speed engines, that is, engines in which the maximum speed does not exceed 600 R. P. M. in which the time interval between injection and the production of the igniting spark is ample for the vaporization of the injected fuel but, in engines which operate at higher speeds, the latter arrangement is preferable in order to provide a maximum time interval between injection and ignition so that the fuel will be at least partially vaporized and can be easily ignited by a properly positioned ignition means.

Furthermore, this manner of charge formation entirely eliminates the necessity for turbulence in the air charge during slow speed operation when it is practically impossible to create and maintain the air in a state of turbulence without materially decreasing the volumetric efficiency or providing a forced air feed equivalent to a supercharging arrangement which involves additional expense and complicates the engine structure. In addition, while some degree of turbulence is desired during high speed operation in order to facilitate mixing and improve the rate of flame propagation and is created in this engine by terminating the inlet passage eccentrically with respect to the axis of the cylinder as is the comon practice in all overhead valve engines, yet no particular degree of turbulence or speed of air rotation is necessary in order to carry the fuel air mixture into igniting relationship with the ignition means, since the injector completely impregnates the air charge with finely atomized fuel and consequently, the timing of injection and ignition is greatly simplified and the proper timing is easily maintained.

The positioning of the spark electrodes or other ignition means in a plane which is substantially parallel to the axis or core of the adjacent spray or sprays issuing from the injection nozzle and out of direct contact therewith permits the use of a multiple apertured nozzle which will substantially instantaneously and completely impregnate the entire air charge with finely atomized fuel and allows the ignition means to be extended into and relatively close to the bottom of the piston cup at a point a material distance from the side wall thereof without danger of fouling the ignition means so that burning will be initiated in the hottest or first vaporized portion of the mixture. Moreover, in arrangements utilizing an ignition means comprising electrodes forming a spark gap, the inner electrode should be longer than the outer electrode and parallel therewith so as to effectively shield the outer electrode from the wetting action of the adjacent spray, so that if any wet fuel should happen to contact the ignition device, it will collect on the inner electrode and drain therefrom without wetting the outer electrode and fouling the device.

In addition, the positioning of the ignition and injection means in the manner hereinbefore pointed out eliminates the provision of slots in the side wall of the piston cup through which the injected fuel can pass and condense on the cooled cylinder wall or in which carbon can collect and cause excessive wear, fouling of the injection or ignition means projecting therethrough and possible breakage.

Furthermore, the initiation of burning in the mixture or charge so that combustion progresses from the hotter to the cooler portions of the charge greatly facilitates and renders positive the ignition of the charge under all conditions of engine operation and especially in engines which operate at speeds materially higher than 600 R. P. M. and the resultant combustion or burning, while extremely rapid, is more orderly and uniform and does not produce detonation or knocking and an accompanying loss of power.

The manner of ignition and the method of charge formation previously described, when combined in a low compression, solid injection engine having timed injection and ignition of the fuel charges, result in an improved operation and an inceased efficiency heretofore unobtainable in known engines of this type regardless of whether or not a piston structure is employed which is designed to facilitate initial vaporization of the injected fuel. However, a piston designed to facilitate initial vaporization of the injected fuel greatly improves the operation and the efficiency of any engine and should be utilized whenever it is possible to do so.

While the invention is disclosed as applied to engines of the four cycle stroke type, it is obviously applicable to any engine of the low compression, solid injection type having timed injection and ignition of the fuel charges regardless of the particular stroke cycle arrangement utilized.

It should be understood that it is not desired to limit the invention to the exact details of construction and operation herein shown and described for various modifications within the scope of the claims may occur to persons skilled in the art.

It is claimed and desired to secure by Letters Patent:

1. The method of obtaining positive ignition and orderly burning at a rate insufficient to produce detonation in a low compression, solid injection engine having timed ignition and a charge forming chamber which comprises maintaining a portion of the charge confining surface of the chamber at an oil vaporizing temperature and providing a confined atmosphere of air in contact with said surface, compressing the confined air to a pressure insufficient to produce self-ignition, spraying and distributing oil during the latter stages of the compression of the confined air and under all conditions of load and speed throughout the air confined within said chamber to form a uniform mixture, and when the spraying of oil ceases immediately initiating burning in that portion of the mixture in proximity to the vaporizing surface whereby the highly vaporized portion of the mixture in proximity to said surface is ignited before material movement or diffusion thereof and combustion progresses from the hotter and more highly vaporized to the cooler and less vaporized portions of the mixture.

2. The method of obtaining positive ignition and orderly combustion at a rate insufficient to produce detonation in injection type engines having timed ignition and a compression pressure insufficient to produce self-ignition which comprises filling the combustion chamber during the latter stages of compression and under all conditions of load and speed with a substantially uniform mixture of finely atomized fuel and air, creating a vaporizing zone in the mixture which is relatively hotter than the remaining portions of the mixture and initiating burning within said zone whereby combustion progresses from the hotter and the more highly vaporized to the cooler and the less vaporized portions of the mixture.

3. The method of obtaining positive ignition and orderly combustion at a rate insufficient to produce detonation in injection type engines having timed ignition and a compression pressure insufficient to produce self-ignition which comprises maintaining a portion of the surface defining the combustion chamber at or slightly above the oil vaporizing temperature, spraying and distributing finely atomized oil throughout the combustion chamber and in contact with said surface during the latter stages of compression and under all conditions of load and speed to form a substantially uniform mixture therein and when the spraying of oil ceases, immediately initiating burning in that portion of the mixture in proximity to said surface whereby combustion progresses from the hotter and more highly vaporized to the cooler and less vaporized portions of the mixture.

4. In an internal combustion engine of the solid injection type having a combustion chamber and a compression pressure insufficient to produce self-ignition, means operative to maintain a portion of the charge confining surface of the combustion chamber at or slightly above the oil vaporizing temperature, injection means rendered operative during the latter stages of compression and under all conditions of load and speed to distribute finely atomized oil throughout the air charge confined in said chamber to form a substantially uniform mixture therein and timed ignition means positioned in proximity to the vaporizing surface and rendered operative to initiate burning at or immediately after the termination of injection whereby the highly vaporized portion of the mixture in proximity to said surface is ignited before material movement or diffusion thereof and combustion progresses from the hotter and more highly vaporized to the cooler and less vaporized portions of the mixture.

5. In an internal combustion engine of the solid injection type having a combustion chamber and a compression pressure insufficient to produce self-ignition, means operative to maintain a portion of the charge confining surface of the combustion chamber at or slightly above the oil vaporizing temperature, a multiple apertured nozzle tip rendered operative during the latter stages of compression and under all conditions of load and speed to uniformly distribute finely atomized oil throughout the air charge confined in said chamber with a plurality of sprays impinging on the vaporizing surface and timed ignition means positioned in proximity to said surface and rendered operative to initiate burning at or immediately after the termination of injection whereby the highly vaporized portion of the mixture is ignited before material movement or diffusion thereof and combustion progresses from the hotter and more highly vaporized to the cooler and less vaporized portions of the mixture.

6. In an internal combustion engine of the solid injection type having a combustion chamber, a piston, and a compression pressure insufficient to produce self-ignition, means operative to maintain the piston head at or slightly above the oil vaporizing temperature, a multiple apertured nozzle tip rendered operative during the latter stages of compression and under all conditions of load and speed to uniformly distribute sprays of finely atomized oil throughout the air charge confined in said chamber with a plurality of sprays impinging on the piston head and timed ignition means positioned in proximity to the piston head when the piston is near its top center position and rendered operative to initiate burning at or immediately after the termination of injection whereby the highly vaporized portion of the mixture is ignited before material movement or diffusion thereof and combustion progresses from the hotter and more highly vaporized to the cooler and less vaporized portions of the mixture.

7. In an internal combustion engine of the solid injection, timed ignition type having a generally cylindrical combustion chamber and a compression pressure insufficient to produce self-ignition, means operative to maintain a portion of the charge confining surface of the combustion chamber at or slightly above the oil vaporizing temperature, means rendered operative during the latter stages of compression and under all conditions of load and speed to uniformly distribute sprays of finely atomized oil throughout the air charge confined within the combustion chamber with a plurality of sprays impinging on the vaporizing surface comprising a nozzle tip positioned at a point remote from the axis of the chamber and having a multiplicity of spray orifices positioned to direct a multiplicity of generally conical sprays laterally of the combustion chamber with the axis of all of the sprays diverging laterally of the chamber when viewed in plan and with the axis of the impinging sprays diverging axially of the chamber with respect to the other sprays when viewed in elevation.

8. In an internal combustion engine of the solid injection timed ignition type having a generally cylindrical combustion chamber and a compression pressure insufficient to produce self-ignition, means rendered operative to maintain a portion of the charge confining surface of the combustion chamber at or slightly above the oil vaporizing temperature, means operative during the latter stages of compression and under all conditions of load and speed to uniformly distribute sprays of finely atomized oil throughout the air charge confined within the combustion chamber with a plurality of sprays impinging on the vaporizing surface comprising a nozzle tip positioned at a point remote from the axis of the chamber and having a multiplicity of spray orifices positioned to direct a multiplicity of generally conical sprays laterally of the combustion chamber with the axis of adjacent sprays diverging both laterally and axially of the chamber when viewed in plan and in elevation whereby alternate sprays impinge on the vaporizing surface.

9. The method of obtaining positive ignition and orderly combustion at a rate insufficient to produce detonation in injection type engines having timed ignition and a compression pressure insufficient to produce self-ignition which comprises filling the combustion chamber during the latter stages of compression and under all conditions of load and speed with a substantially uniform mixture of finely atomized fuel and air, maintaining the fuel air ratio substantially constant throughout the operating range of the engine, creating a vaporizing zone in the mixture which is relatively hotter than the remaining portions of the mixture and initiating burning within said zone whereby combustion progresses from the hotter and the more highly vaporized to the cooler and the less vaporized portions of the mixture.

NICHOLAS FODOR.